US006625186B1

(12) United States Patent
Wang et al.

(10) Patent No.: US 6,625,186 B1
(45) Date of Patent: Sep. 23, 2003

(54) LASER FREQUENCY DOUBLING DEVICE OF RECA$_4$O(BO$_3$)$_3$ CRYSTAL WITH SPECIFIC CUT ANGLES

(75) Inventors: Jiyang Wang, Shanda Nanlu Jinan (CN); Chuangtian Chen, Zhongguancun Beijing (CN); Zongshu Shao, Shanda Nanlu Jinan (CN); Jie Jiang, Zhongguancun Beijing (CN); Xiaobo Hu, Shanda Nanlu Jinan (CN); Jiao Lin, Zhongguancun Beijing (CN); Yaogang Liu, Shada Nanlu Jinan (CN); Ning Ye, Zhongguancun Beijing (CN); Baichang Wu, Zhongguancun Beijing (CN); Minhua Jiang, Shanda Nanlu Jinan (CN)

(73) Assignees: Shandong University, Shandong (CN); Cryogenic Laboratory, Chinese Academy of Sciences, Beijing (CN)

(*) Notice: Subject to any disclaimer, the term of this patent is extended or adjusted under 35 U.S.C. 154(b) by 375 days.

(21) Appl. No.: 09/590,271

(22) Filed: Jun. 9, 2000

(30) Foreign Application Priority Data

Jun. 11, 1999 (CN) .......................................... 99112260 A

(51) Int. Cl.$^7$ ................................................ H01S 3/16
(52) U.S. Cl. ....................................................... 372/41
(58) Field of Search .................................... 372/39, 41

(56) References Cited

PUBLICATIONS

Technology News, Kevin Robinson, www.Photonics.com, Jun. 1998.*
"Growth of oxoborate crystals for non–critical phase matching,", Reino et al. Bulk Crystal Growth talks Overview, Internet, at least by 2000.*
G. Aka et al., "Linear– and nonlinear–optical properties of a new gadolinium calcium oxoborate crystal, Ca$_4$GdO(BO$_3$)$_3$," J. Opt. Soc. Am. B., vol. 14, No. 9, pp. 2238–2247 (Sep. 1997).
M. Iwai et al., "Crystal growth and optical characterization of rare–earth (Re) calcium oxyborate ReCa$_4$O(BO$_3$)$_3$ (Re=Y or Gd) as new nonlinear optical material," Jpn. J. Appl. Phys., vol. 36, pp. L276–L279 (Mar. 1997).

* cited by examiner

Primary Examiner—Leon Scott, Jr.
(74) Attorney, Agent, or Firm—Venable LLP

(57) ABSTRACT

The present invention belongs to the field of optoelectronics. The main content of the present invention is to determine the optimum cut-orientations of ReCOB crystal frequency-doubling devices. For an example, the cut-angles of the YCOB crystal for 1064 nm are $\theta_1=(65.9\pm5.0)°$, $\phi_1=(36.9\pm5.0)°$ or $\theta_2=(66.3\pm5)°$, $\phi_2=(143.5\pm5)°$. The present invention has solved the problem of low frequency-doubling conversion efficiency in the prior technique. The frequency-doubling technique of the present invention has advantages of high frequency-doubling conversion efficiency and low energy dissipation, and is useful for the application of the ReCOB crystal.

8 Claims, 2 Drawing Sheets

LASER FREQUENCY DOUBLING DEVICE OF RECA₄O(BO₃)₃ CRYSTAL WITH SPECIFIC CUT ANGLES

CROSS-REFERENCE TO RELATED APPLICATIONS

The subject application claims a priority under 35 U.S.C. §119 on Chinese Patent Application No. 99112260.7, filed on Jun. 11, 1999.

RELATED FIELD OF THE INVENTION

The present invention relates to a laser frequency doubling device of the Re $Ca_4O$ $(BO_3)_3$, ReCOB for short (Re=Gd, Y) crystal with specific cut angles. It belongs to the field of optoelectronics.

ReCOB discovered by Aka etc. is a type of artificial nonlinear optical crystals. It has been found that YCOB and GdCOB crystals have the features of the larger nonlinear optical effect (which comparable to $LiB_3O_5$ crystal) and easy growth. The typical size of the crystal is up to ϕ50×100 mm. It has been also found that the red, green and blue visible laser can be effectively generated by the two crystals through doubling the frequency of 1340 nm, 1064 nm, 1053 nm, 940 nm laser. In addition, since the ions Gd and Y of the two crystals can be easily replaced by the stimulated ions Nd, and Yb, the self-frequency doubling crystal of Nd: YCOB, Yb: YCOB or the like can be formed. The self-frequency doubled output of the crystals can be up to 50 mw. Therefore, Nd: YCOB and Yb: YCOB are also self-frequency doubling crystal materials. Widespread interest in the above-mentioned materials has been attracted in the science and technology circles because of the advantages of the materials.

BACKGROUND OF THE INVENTION

The ReCOB crystal which belongs to the monoclinic m point group is the lowest symmetry crystal among the all practical nonlinear crystal materials, also is one of the lowest symmetry crystals in all the nonlinear crystals known so far. According to the crystal point group symmetry, the nonlinear optical coefficients $d_{ij}$ (i=1–3, j=1–6, wherein 1→11, 2→22, 3→33, 4→23, 5→13, 6→12,) have as many as 8 non-zero components. Considering that the frequency-doubling coefficients should obey the Kleinman symmetry condition, this type of crystals has still 6 independent $d_{ij}$ coefficients, i.e. $d_{33}$, $d_{11}$, $d_{32}$, $d_{12}$, $d_{13}$ and $d_{31}$. In principle 4 coefficients $d_{33}$, $d_{11}$, $d_{31}$, $d_{13}$ can be measured by the Maker fringes method, while $d_{32}$, $d_{13}$ can be measured by phase-matching method. However, the frequency-doubling coefficients of these crystals have not been determined until now. Therefore, it is difficult to calculate the effective frequency-doubling coefficients of the crystals, and to determine further the optimum cut angles for the fabrication of the frequency-doubling devices. Japanese scientists have determined the preliminary effective frequency doubling coefficient of the YCOB crystal at the orientation of θ=33° and ϕ=9° in 1997. Most of scientists now believe that the optimum phase matching orientation (i. e. The largest effective frequency-doubling coefficient is in this orientation) is θ=33° and ϕ=9°. The new result of the self-frequency doubling experiments of Nd:YCOB also indicated that this is the optimum phase-matching orientation. However, the theoretical calculation and the experimental measurement demonstrated that the orientation of θ=33° and ϕ=9° is not the optimum phase-matching orientation for YCOB.

SUMMARY OF THE INVENTION

The object of the present invention is to find the optimum cut orientation of the ReCOB crystal for the fabrication of laser frequency doubling device, such that the laser frequency-doubling devices fabricated from the ReCOB crystal with specific cut angles according to the present invention have larger frequency-doubling conversion efficiency than that according to the prior technique.

The main content of the present invention is to determine optimum cut orientation of the ReCOB crystal frequency-doubling device for the incident laser beam of 1340 nm, 1064 nm, 1053 nm, 940 nm. The device cut-angles are as following:

(1) The device cut-angles are: $θ_1=(67.0±5.0)°$, $ϕ_1=(27.5±5.0)°$ or $θ_2=(67.0±5.0)°$, $ϕ_2=(152.5±5.0)°$, when the frequency-doubling crystal is YCOB, $λ_ω=134$ nm;

(2) The device cut-angles are: $θ_1=(65.9±5.0)°$, $ϕ_1=(36.9±5.0)°$ or $θ_2=(66.3±5.0)°$, $ϕ_2=(143.5±5.0)°$, when the frequency-doubling crystal is YCOB $λ_ω=1064$ nm;

(3) The device cut-angles are: $θ_1=(65.0±5.0)°$, $ϕ_1=(37.1±5.0)°$ or $θ_2=(65.7±5.0)°$, $ϕ_2=(142.9±5.0)°$ when the frequency-doubling crystal is YCOB, $λ_ω=1053$ nm;

(4) The device cut-angles are: $θ_1=(64.4±5.0)°$, $ϕ_1=(44.8±5.0)°$ or $θ_2=(66.8±5.0)°$, $ϕ_2=(135.3±5.0)°$ when the frequency doubling crystal is YCOB, $λ_ω=940$ nm;

(5) The device cut-angles are: $θ_1=(64.5±5.0)°$, $ϕ_1=(34.4±5.0)°$ or $θ_2=(66.5±5.0)°$, $ϕ_2=(145.7±5.0)°$ when the frequency-doubling crystal is GdCOB, $λ_ω=1340$ nm;

(6) The device cut-angles are: $θ_1=(62.0±5.0)°$, $ϕ_1=(47.8±5.0)°$ or $θ_2=(67.0±5.0)°$, $ϕ_2=(132.6±5.0)°$ when the frequency-doubling crystal is GdCOB, $λ_ω=1064$ nm;

(7) The device cut-angles are: $θ_1=(62.0±5.0)°$, $ϕ_1=(48.7±5.0)°$ or $θ_2=(67.0±5.0)°$, $ϕ_2=(131.7±5.0)°$ when the frequency-doubling crystal is GdCOB, $λ_ω=1053$ nm;

(8) The device cut-angles are: $θ_1=(60.5±5.0)°$, $ϕ_1=(61.5±5.0)°$ or $θ_2=(68.0±5.0)°$, $ϕ_2=(119.9±5.0)°$ when the frequency-doubling crystal is GdCOB, $λ_ω=940$ nm.

Using anion group theory, the present invention calculated for the first time the frequency-doubling coefficients of YCOB and GdCOB crystals. Table 1 lists theoretical $d_{ij}$ values calculated respectively by Gaussian 92 and CNDO quantum chemistry programs based on the anion group theory for YCOB and GdCOB. Table 1 also lists $d_{33}$ and $d_{32}$ values of the YCOB crystal, $d_{33}$ value of the GdCOB crystal and other $d_{ij}$ values measured by the Maker fringes method. The agreement between the experimental values and the theoretical values are excellent. Furthermore, it is determined by the symmetry theory that the phase-matching orientation of ReCOB have mmm space symmetry (m is perpendicular to refractive principal axes X.Y.Z respectively). Therefore, with only one space quadrant for example the first quadrant (0°≦θ≦90°, 0°≦ϕ≦90°) all device cut-angle orientations can be found by mmm symmetry. With symmetrical theory it is also determined that the effective frequency-doubling coefficient $d_{eff}$ has the 2/m (m⊥Y) space symmetry. Therefore, in the first and second quadrants, $d_{eff}$ values are independent. Once $d_{eff}$ values are determined in the two quadrants the $d_{eff}$ values in all phase-matching space can be found by symmetry 2/m, i.e. once the orientations of the largest $d_{eff}$ values are found in the first and second quadrants, the optimum frequency doubling-orientations of the whole space can be found.

TABLE 1 the frequency-doubling coefficients of YCOB
and GdCOB crystals (unit: pm/V)

| Crystal | $d_{ij}$ | Calculated value Gauss 92 | Calculated value CNDO | Measured value by Maker fringes method |
|---|---|---|---|---|
| YCOB | $d_{33}$ | −1.018 | −1.236 | +0.92 |
|  | $d_{11}$ | −0.104 | 0.056 | ≈0 |
|  | $d_{12}$ | −0.015 | 0.128 | <<$d_{32}$ |
|  | $d_{13}$ | −0.253 | −0.186 | <<$d_{33}$ |
|  | $d_{31}$ | 0.120 | 0.151 | <<$d_{33}$ |
|  | $d_{32}$ | 0.757 | 1.081 | ±1.34 |
| GdCOB | $d_{33}$ | −0.903 | −1.14 | ±0.5761 |
|  | $d_{11}$ | 0.050 | 0.050 | ≈0 |
|  | $d_{12}$ | 0.128 | 0.166 | ≈0 |
|  | $d_{13}$ | −0.183 | −0.22 | <<$d_{33}$ |
|  | $d_{31}$ | 0.127 | 0.16 | ≈0 |
|  | $d_{32}$ | 0.741 | 1.00 | ±0.6846 |

Taking the four conventional laser wavelength 1340 nm, 1064 nm, 1053 nm, 940 nm for examples (using the determined $d_{ij}$ values and the refraction dispersion relation), the present invention has calculated the $d_{eff}$ distribution in the first and second quadrants (0°≦θ≦90°, 0°≦φ≦180°) of the ReCOB crystal at the four wavelengths. FIG. 1 gives the $d_{eff}$ space distribution of the YCOB crystal at 1064 nm. Using the $d_{ij}$ values, the optimum cut-angles of $\theta_1$=65.9°, $\Phi_1$=36.9° and $\theta_2$=66.3° $\Phi_2$=143.5° for fabricating the 1064 nm laser frequency-doubling device of the YCOB crystal have been determined.

In order to confirm the effect of the present invention, the space distribution of the frequency-doubling coefficients of the YCOB crystal was measured experimentally. The measured result for YCOB is given here: the effective frequency-doubling coefficient is $d_{eff}$=2.45 pm/v. If the YCOB crystal is cut in any of the seven phase-matching orientations (see table 2) θ=32°, φ=0°; θ=33°, φ=9°; θ=64.5°, φ=35.5° .... The length in the phase-matching direction is 2 mm, the type II cut KTP crystal is used as a reference sample, then the effective frequency-doubling coefficient is $d_{eff}$=2.45 pm/v. The 1064 nm fundamental wave beam is used in the experiment. In table 2 the experimental values of the effective frequency-doubling coefficients of the YCOB crystal in different phase-matching orientations are also given.

TABLE 2 the measured frequency-doubling conversion efficiencies
and the effective frequency-doubling coefficient values

| Sequence | Orientation (θ, φ) | Crystal length (mm) | Frequency-doubling conversion (%) | $d_{eff}$ (pm/V) |
|---|---|---|---|---|
| 1 | 32°, 0° | 2 | 1.5 | 0.528 |
| 2 | 33°, 9° | 2 | 1.3 | 0.518 |
| 3 | 64.5°, 35.5° | 2 | 2.4 | 0.707 |
| 4 | 66.8°, 35.4° | 2 | 2.34 | 0.66 |
| 5 | 113.2°, 35.4° * | 2 | 2.57 | 0.707 |
| 6 | 115.5°, 35.5° + | 2 | 2.6 | 0.754 |
| 7 | 90°, 33.6° | 2 | 1.07 | 0.46 |

* with the same value of 66.8°, 144.6°; + with the same value of 64.5°, 144.5°

It can be seen from table 2 that the measured and calculated $d_{eff}$ distributions are in agreement not only in the orientation but also closed in the magnitude. For example, the experiments indicate that the maximum values of the effective frequency-doubling coefficient of the YCOB crystal are at two positions of (θ=64.5°, Φ=35.5°) and (θ=115.5°, Φ=35.5°), and the calculated values are at (θ=65.9°, Φ=36.9°) and (θ=113.7°, Φ=36.5°). The error is only within 5%. Also, the experiments confirmed the calculated result of $d_{eff}$(θ=113.7°, Φ=36.5°)>$d_{eff}$(θ=65.9°, Φ=36.9°). In addition, in regard to the effective frequency-doubling coefficient, the calculated value is $d_{eff}$(θ=65.9°, Φ=36.9°)/$d_{eff}$(θ=31.7°, Φ=0°)=1.31, while the experimental value is $d_{eff}$(θ=64.5°, Φ=35.5°)/$d_{eff}$(θ=32°, Φ=0°)=1.34. Therefore, our conclusion is confirmed directly by using phase-matching method, and the orientation of maximum effective frequency-doubling coefficient of the YCOB crystal is neither in the x-z principal plane nor is in the phase-matching orientation of θ=33°, Φ=9°, but is in the orientation of θ=65.9°±5°, Φ=36.9°±5° and θ=66.30°±5°, Φ=143.50°±5° respectively. It is also proved that the frequency-doubling conversion efficiency of the frequency-doubling devices fabricated according to the present invention is 1.8 and 2.0 times higher than that in the orientation of θ=33°, Φ=9° used in the prior technique.

As mentioned before, the frequency-doubling conversion efficiency of the laser frequency-doubling device with the specific cut-angles according to the present invention is higher than that of the prior technique. Therefore, energy dissipation is reduced, and the performance of ReCOB is fully developed, and it is useful to the application of the ReCOB crystal.

DESCRIPTION OF THE DRAWINGS

In FIG. 1, 1 shows the $d_{eff}$ maximum cut-angle orientation (θ=65.9°, Φ=36.9°) in the first quadrant, 2 shows the $d_{eff}$ maximum cut-angle orientation (θ=66.3°, Φ=143.5°) in the second quadrant.

In FIG. 2, 1 shows the frequency-doubling device of the YCOB crystal.

In FIG. 3, 1 shows the frequency-doubling device of the YCOB crystal, 2,3 show lenses.

In FIG. 4, 1 shows a frequency-doubling device of the YCOB crystal, 2,3 show lenses, 4 shows a polarizer.

DETAILED DESCRIPTION OF THE INVENTION

Embodiment 1

Figure 1:
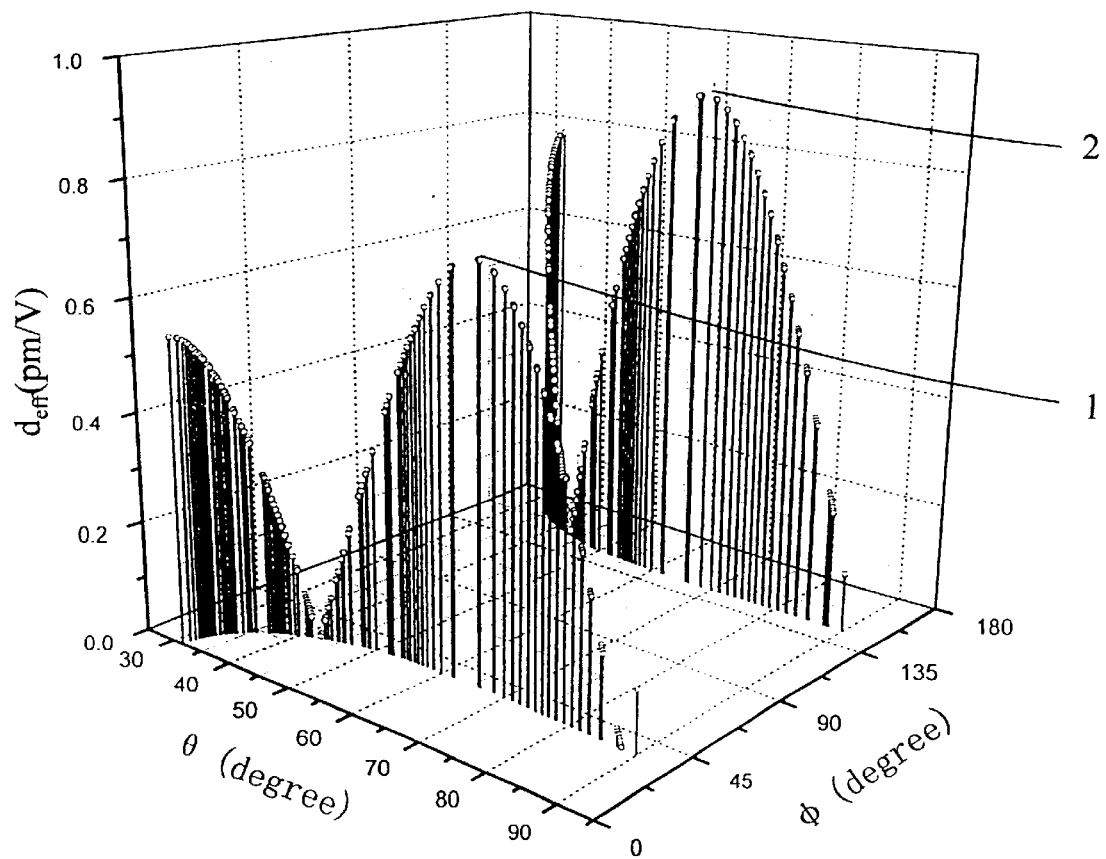
FIG. 1 is a diagram of the space distribution of the effective frequency-doubling coefficient of the YCOB crystal at 1064 nm.
Figure 2:
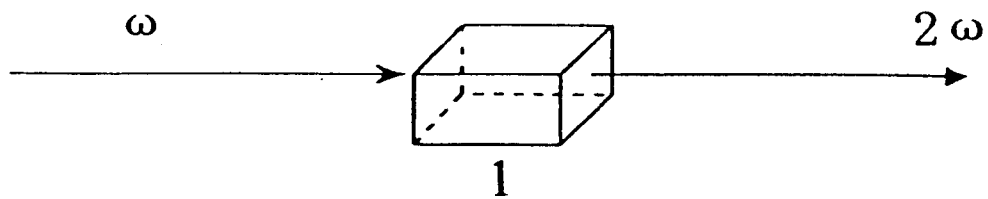
FIG. 2 is a schematic drawing of the direct frequency-doubling system of the YCOB crystal.

A YCOB crystal direct laser frequency-doubling device, its schematic drawing is as shown in FIG. 2. The 1064 nm polarized fundamental wave beam incident perpendicularly on the YCOB crystal 1 is from a sonic-light Q-switched ns Nd: YAG laser, wherein the YCOB crystal 1 is cut in the orientation of θ=65.9°±5°, Φ=36.9°±5°, or θ=66.3°±5°, Φ=143.5°±5°, and the 532 nm outgoing frequency-doubled laser beam is polarized in the direction perpendicular to the polarization direction of the incident fundamental wave beam.

Embodiment 2

Figure 3:
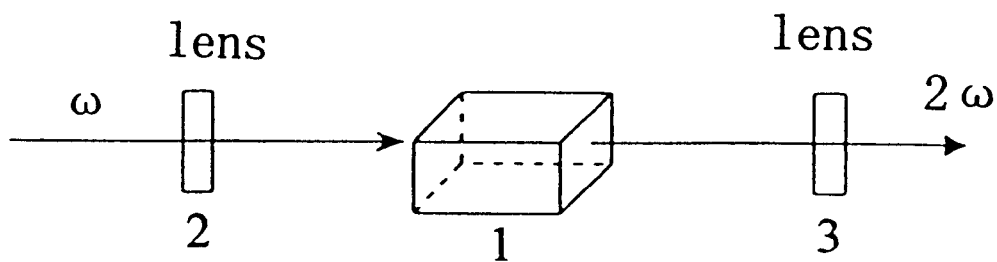
FIG. 3 is a schematic drawing of the focused laser beam frequency-doubling system of the YCOB crystal.

A YCOB crystal focused-doubling device, its schematic drawning is as shown in FIG. 3.

The 1064 nm polarized fundamental wave beam from a electro-light Q switched ns Nd: YAG Laser is perpendicularly incident on the YCOB 1 through a focusing system 2, wherein the focusing system 2 can be a single lens, a set of lenses (a compound lens), a focusing spherical mirror, or the like, and the crystal 1 is cut in the orientation of $\theta=65.9°\pm5°$, $\Phi=36.9°\pm5°$, or $\theta=66.3°\pm5°$, $\Phi=143.5°\pm5°$. The 532 nm outgoing frequency-doubling laser beam collimated by a collimating system 3 is polarized in a direction perpendicular to that of the incident fundamental wave beam, wherein the collimating system 3 can be a single lens, a set of lenses (a compound lens), a focusing spherical mirror, or the like.

Embodiment 3

Figure 4:
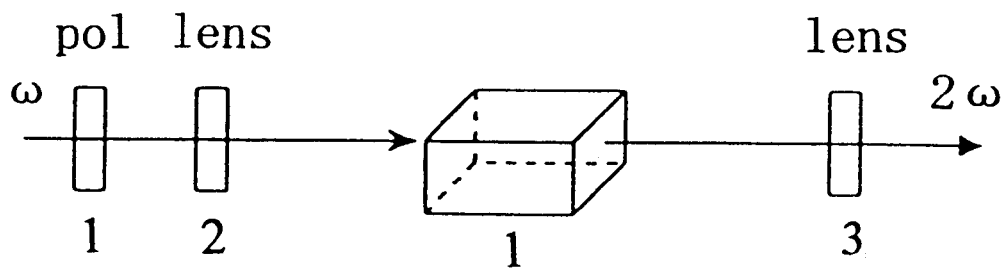
FIG. 4 is a schematic drawing of a non-polarized laser beam frequency-doubling system of the YCOB crystal.

A YCOB crystal non-polarized laser frequency-doubling device, its schematic drawing it as shown in FIG. 4. The 1064 nm fundamental wave beam perpendicularly incident on the YCOB crystal is from a sonic-light mode-locked Nd: YAG Laser. Since the laser output is a non-polarized beam, a polarizer 4 is used to produce a 1064 nm polarized laser beam, which is incident on the YCOB crystal 1 through a focusing system 2, which can be a single lens, a set of lenses (a compound lens), a focusing spherical mirror, or the like, The YCOB crystal is cut in the orientation of $\theta=65.9°\pm5°$, $\Phi=36.9°\pm5°$, or $\theta=66.3°\pm5°$, $\Phi=143.5°\pm5°$. The 532 nm outgoing polarized frequency-doubled laser beam collimated by the collimating system 3 is polarized in a direction perpendicular to the polarization direction of the incident fundamental wave beam.

What is claimed is:

1. A laser frequency-doubling device comprising a $ReCa_4O(BO_3)_3$ (ReCOB) crystal which is machined in a cut angle orientation having device cut angles $\theta$ and $\Phi$ for an incident laser beam having a wavelength $\lambda_\omega$,
   wherein the wavelength $\lambda_\omega$ is 1340 nm, the crystal is YCOB, and the device cut angles $\theta$ is from about 64.5° to about 69.5°, and $\Phi$ is from about 25.0° to about 30.0° or from about 150.0° to about 155.0°, such that the frequency-doubling efficiency of said frequency-doubling device is maximized.

2. A laser frequency-doubling device comprising a $ReCa_4O(BO_3)_3$ (ReCOB) crystal which is machined in a cut angle orientation having device cut angles $\theta$ and $\Phi$ for an incident laser beam having a wavelength $\lambda_\omega$,
   wherein the wavelength $\lambda_\omega$ is 1064 nm, the crystal is YCOB, and the device cut angles $\theta$ is from about 63.4° to about 68.4°, and $\Phi$ is from about 34.4° to about 39.4° or from about 141.0° to about 146.0°, such that the frequency-doubling efficiency of said frequency-doubling device is maximized.

3. A laser frequency-doubling device comprising a $ReCa_4O(BO_3)_3$ (ReCOB) crystal which is machined in a cut angle orientation having device cut angles $\theta$ and $\Phi$ for an incident laser beam having a wavelength $\lambda_\omega$,
   wherein the wavelength $\lambda_\omega$ is 1053 nm, the crystal is YCOB, and the device cut angles $\theta$ is from about 63.5° to about 68.5°, and $\Phi$ is from about 34.6° to about 39.6° or from about 140.4° to about 145.4°, such that the frequency-doubling efficiency of said frequency-doubling device is maximized.

4. A laser frequency-doubling device comprising a $ReCa_4O(BO_3)_3$ (ReCOB) crystal which is machined in a cut angle orientation having device cut angles $\theta$ and $\Phi$ for an incident laser beam having a wavelength $\lambda_{107}$,
   wherein the wavelength $\lambda_\omega$ is 940 nm, the crystal is YCOB, and the device cut angles $\theta$ is from about 61.9° to about 66.9°, and $\Phi$ is from about 42.3° to about 47.3° or from about 132.8° to about 137.8°, such that the frequency-doubling efficiency of said frequency-doubling device is maximized.

5. A laser frequency-doubling device comprising a $ReCa_4O(BO_3)_3$ (ReCOB) crystal which is machined in a cut angle orientation having device cut angles $\theta$ and $\Phi$ for an incident laser beam having a wavelength $\lambda_\omega$,
   wherein the wavelength $\lambda_\omega$ is 1340 nm, the crystal is GdCOB, and the device cut angles $\theta$ is from about 62.0° to about 67.0°, and $\Phi$ is from about 31.9° to about 36.9° or from about 143.2° to about 148.2°, such that the frequency-doubling efficiency of said frequency-doubling device is maximized.

6. A laser frequency-doubling device comprising a $ReCa_4O(BO_3)_3$ (ReCOB) crystal which is machined in a cut angle orientation having device cut angles $\theta$ and $\Phi$ for an incident laser beam having a wavelength $\lambda_\omega$,
   wherein the wavelength $\lambda_\omega$ is 1064 nm, the crystal is GdCOB, and the device cut angles $\theta$ is from about 59.5° to about 64.5°, and $\Phi$ is from about 45.3° to about 50.3° or from about 130.0° to about 135.0°, such that the frequency-doubling efficiency of said frequency-doubling device is maximized.

7. A laser frequency-doubling device comprising a $ReCa_4O(BO_3)_3$ (ReCOB) crystal which is machined in a cut angle orientation having device cut angles $\theta$ and $\Phi$ for an incident laser beam having a wavelength $\lambda_\omega$,
   wherein the wavelength $\lambda_\omega$ is 1053 nm, the crystal is GdCOB, and the device cut angles $\theta$ is from about 59.5° to about 64.5°, and $\Phi$ is from about 46.2° to about 51.2° or from about 129.2° to about 134.2°, such that the frequency-doubling efficiency of said frequency-doubling device is maximized.

8. A laser frequency-doubling device comprising a $ReCa_4O(BO_3)_3$ (ReCOB) crystal which is machined in a cut angle orientation having device cut angles $\theta$ and $\Phi$ for an incident laser beam having a wavelength $\lambda_\omega$,
   wherein the wavelength $\lambda_\omega$ is 940 nm, the crystal is GdCOB, and the device cut angles $\theta$ is from about 58.0° to about 63.0°, and $\Phi$ is from about 59.0° to about 64.0° or from about 117.4° to about 122.4°, such that the frequency-doubling efficiency of said frequency-doubling device is maximized.

* * * * *